UNITED STATES PATENT OFFICE.

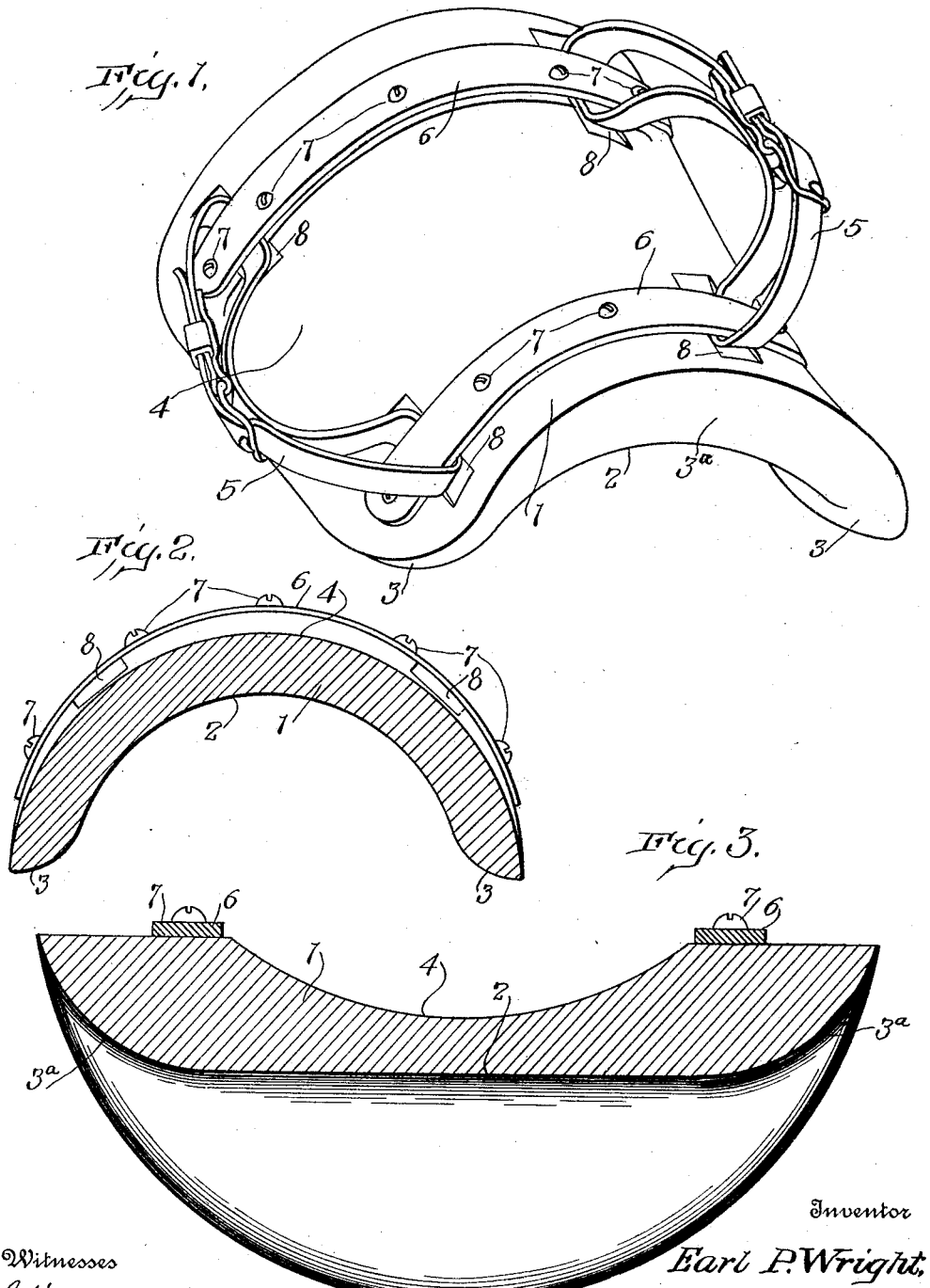

EARL P. WRIGHT, OF MARION, OHIO, ASSIGNOR OF ONE-HALF TO CLARK W. WRIGHT, OF MARION, OHIO.

COLLAR-PAD.

1,105,169.  Specification of Letters Patent.  Patented July 28, 1914.

Application filed October 23, 1911.  Serial No. 656,165.

*To all whom it may concern:*

Be it known that I, EARL P. WRIGHT, a citizen of the United States, residing at Marion, in the county of Marion and State of Ohio, have invented certain new and useful Improvements in Collar-Pads, of which the following is a specification, reference being had therein to the accompanying drawing.

This invention relates to collar pads for harness and the object of the invention is to produce a collar pad which will present a hard, smooth surface to the neck of the animal under all conditions of service and wear and which will prevent the collar from being drawn so tight as to pinch the neck of the animal.

In the accompanying drawings, Figure 1 is a perspective view of a collar pad embodying my invention; Fig. 2 is a transverse, sectional view of the same; and Fig. 3 is a longitudinal, sectional view thereof.

In carrying out my invention I form the pad from a block of hard, non-flexible material and so shape the lower surface of the block as to cause it to conform approximately to the shape of the upper portion of the neck of the animal to which the collar and the pad are to be applied. The edges of this surface are rounded or flared outwardly in such a manner that a smooth, continuous surface may be presented to the neck of the animal in any position which the pad may assume with relation to the neck of the animal while in use. The pad is provided with means for rigidly securing the same to the collar. This preferably is accomplished by forming a transverse groove in the outer surface of the block to receive the collar and providing the block with straps for securing the same to the collar.

In the present instance I have illustrated the pad as comprising a single block, 1, of wood provided in the lower portion thereof with a longitudinal groove 2 having a rounded base and having its side walls diverging downwardly, the width and depth of the groove being such that it will receive and fit snugly upon the upper portion of the neck of the horse or other animal on which the pad is to be used. The lower longitudinal edges of the curved surface of the block are rounded or slightly flared outward, as indicated at 3, so that these edges will have no sharp corners which can be brought into contact with the neck of the animal by any twisting or turning of either the neck or the pad so as to alter their relative positions. The end portions of the walls of the groove are rounded or flared upwardly and outwardly, as shown at 3$^a$, so that should the pad be tilted, owing to the displacement of the collar in backing or otherwise, or should the animal throw his head upward there will be no corner, projection or rough part to come in contact with the neck of the animal.

The material of which the pad is formed, which in the present instance is wood, will not roughen with wear but on the contrary wears smooth. It will not be affected in any way by perspiration or moisture of any kind, nor will any condition of service or use cause it to become rough or irregular. The body of the block being continuous dust and dirt are prevented from entering except at the ends and the character of the block is such that it is self cleaning, any dirt or matter which may adhere thereto being displaced by contact with the neck of the animal. As a result of the shape of the pad and its permanent, hard, smooth surface it will not rub the neck of the animal in such a manner as to cause it to become sore. Neither will it rub or wear the mane in the manner which so commonly results from the ordinary flexible pads which become wrinkled and caked with wear. Furthermore, the pad is absolutely rigid and the collar may be drawn as tightly as is desired without distorting the pad or causing the collar to pinch at the top.

The pad may be attached to the collar in any suitable manner, but to make this connection a firm one and prevent the collar having movement longitudinally to the pad I have formed a transverse groove 4 in the upper or outer surface of the pad within which the upper portion of the collar fits and to which it may be secured by means of straps 5 attached to the pad in any suitable manner. In the present construction I have provided an attaching means for the straps which has the additional function of reinforcing the pad and tending to prevent the wood from splitting along the grain. This means comprises a bar of metal 6 curved to conform to the curvature of the outer portion of the block and rigidly secured thereto by means of screws 7. Preferably one of these bars is secured to the block on each side of the transverse groove 4 and the block is provided on opposite sides of its longitudinal center with recesses or short longitudinal grooves 8 extending under the respective bars 6 and forming passages through which the straps may be passed to connect them with the pad.

While I have shown and described one embodiment of my invention it will be understood that this is chosen for the purpose of illustration only and that I do not desire to be limited to the details of construction shown and described, for obvious modifications will occur to a person skilled in the art.

Having thus fully described my invention, what I claim as new and desire to secure by Letters Patent, is:—

As an article of manufacture, a collar pad comprising a single block of wood having a longitudinal groove in the lower portion thereof to receive the upper portion of the neck of the animal, said groove having a rounded base flared upwardly at its ends and having diverging side walls, the lower edge of each side wall being rounded outwardly and curved from end to end, the rounded, curved edges of said side walls merging with the flared ends of said base, said block having a transverse groove in the top thereof to receive the upper portion of the collar, said last-mentioned groove having its lateral edges spaced away from the ends of said block, having its greatest depth at its uppermost portion and tapering gradually outward toward the lateral edges of said block to form a smooth continuous seat for said collar, reinforcing bars extending transversely of said block between said last-mentioned groove and the respective ends of said block, curved to conform to the contour of the outer surface of said block and rigidly secured thereto, and fastening devices passing about said bars and adapted to secure the pad to said collar.

In testimony whereof I affix my signature in presence of two witnesses.

EARL P. WRIGHT.

Witnesses:
   Geo. B. Scofield,
   Harvey O. Crawbaugh.

---

Copies of this patent may be obtained for five cents each, by addressing the "Commissioner of Patents Washington, D. C."